United States Patent
Gianakopoulos (10) Patent No.: US 10,529,017 B1
(45) Date of Patent: Jan. 7, 2020

(54) AUTOMATED BUSINESS PLAN UNDERWRITING FOR FINANCIAL INSTITUTIONS

(71) Applicant: John George Gianakopoulos, Mountain View, CA (US)

(72) Inventor: John George Gianakopoulos, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 602 days.

(21) Appl. No.: 15/169,714

(22) Filed: May 31, 2016

(51) Int. Cl.
*G06Q 40/02* (2012.01)
*G06Q 10/06* (2012.01)

(52) U.S. Cl.
CPC ........ *G06Q 40/025* (2013.01); *G06Q 10/067* (2013.01); *G06Q 10/0637* (2013.01)

(58) Field of Classification Search
None
See application file for complete search history.

(56) References Cited

U.S. PATENT DOCUMENTS

| | | | | |
|---|---|---|---|---|
| 7,844,475 B1* | 11/2010 | Murphy | ............... | G06Q 30/02 434/322 |
| 2008/0288416 A1* | 11/2008 | Arnott | ............... | G06Q 30/02 705/36 R |
| 2014/0074762 A1* | 3/2014 | Campbell | ............... | G06Q 40/00 706/46 |
| 2015/0112854 A1* | 4/2015 | Guriel | ............... | G06Q 40/025 705/38 |
| 2016/0232546 A1* | 8/2016 | Ranft | ............... | G06Q 30/0206 |

OTHER PUBLICATIONS

M. Better, Advances in analytics: Integrating dynamic data mining with simulation optimization, IBM J. Res. & Dev. vol. 51 No. 3/4 May/Jul. 2007. pp. 477-487.*
Anna Kaczorowska et al., Comprehensive Methods of Evaluation and Project Efficiency Account, 2016, Proceedings of the Federated Conference on Computer Science and Information Systems, ACSIS, vol. 8. ISSN 2300-5963, pp. 1159-1168.*

* cited by examiner

*Primary Examiner* — Mehmet Yesildag
*Assistant Examiner* — Matthew H Divelbiss
(74) *Attorney, Agent, or Firm* — Ferguson Braswell Fraser Kubasta PC (57) ABSTRACT

A method for underwriting a business loan. The method includes obtaining a collection of business records of existing business entities, where a business record includes a business entity profile, recorded incomes, and recorded expenses, generating, based on the business records, a model that correlates the business entity profile, the recorded incomes, and the recorded expenses, obtaining a business plan of a proposed business entity, where the business plan includes a proposed business entity profile, projected incomes, and projected expenses, and generating, by using at least the proposed business entity profile as an input to the model, a statistical measure of deviation of the projected incomes and the projected expenses with respect to the existing business entities.

20 Claims, 7 Drawing Sheets

ABC Bank | Personal | Small Business | Commercial

Small Business > Business Loans and Lines of Credit

Business Loans and Lines of Credit

Upload Your Business Plan  (1 of 2)

Business Plan Input
Menu A
321

1. [Industry ▶]

Address

2. [City]  [State ▶]  [Zip Code]

3. [# of employees]  [Age (years)]  [Entity Type ▶]

Financials

Projected for next year

4. [Revenue]  [Expenses]  [Profit]

Screenshot B
320

AUTOMATED BUSINESS PLAN UNDERWRITING FOR FINANCIAL INSTITUTIONS

BACKGROUND

A business plan is a formal statement of business goals, reasons they are attainable, and plans for reaching them. It may also contain background information about the organization or team attempting to reach those goals. Business plans may target changes in perception and branding by the customer, client, taxpayer, or larger community. When a new business plans to enter a target market, or when an existing business is to assume a major change or plan a new venture, a three to five year business plan is commonly prepared for investors or financial institutions to evaluate investment returns in that timeframe.

Financial institutions (e.g., banks) have large underwriting costs to approve small businesses for loans. The largest cost to underwriting a small business is analyzing the business plan. Small-sized loans (e.g., with a loan amount less than $500,000) are relatively expensive to underwrite and therefore are not profitable for the banks. As a result, many banks turn down well qualified small businesses for financing.

SUMMARY

In general, in one aspect, the invention related to a method for underwriting a business loan. The method includes obtaining a plurality of business records of a plurality of existing business entities, wherein a business record of the plurality of business records comprises a business entity profile, a plurality of recorded incomes, and a plurality of recorded expenses, generating, based on the plurality of business records, a model that correlates the business entity profile, the plurality of recorded incomes, and the plurality of recorded expenses, obtaining a business plan of a proposed business entity, wherein the business plan comprises a proposed business entity profile, a plurality of projected incomes, and a plurality of projected expenses, and generating, by using at least the proposed business entity profile as an input to the model, a statistical measure of deviation of the plurality of projected incomes and the plurality of projected expenses with respect to the plurality of existing business entities.

In general, in one aspect, the invention related to a system for underwriting a business loan. The system includes (i) a computer processor, (ii) memory storing instructions executable by the computer processor, wherein the instructions comprise functionality for obtaining a plurality of business records of a plurality of existing business entities, wherein a business record of the plurality of business records comprises a business entity profile, a plurality of recorded incomes, and a plurality of recorded expenses, generating, based on the plurality of business records, a model that correlates the business entity profile, the plurality of recorded incomes, and the plurality of recorded expenses, obtaining a business plan of a proposed business entity, wherein the business plan comprises a proposed business entity profile, a plurality of projected incomes, and a plurality of projected expenses, and generating, by using at least the proposed business entity profile as an input to the model, a statistical measure of deviation of the plurality of projected incomes and the plurality of projected expenses with respect to the plurality of existing business entities, and (iii) a repository configured to store the plurality of business records.

In general, in one aspect, the invention related to a non-transitory computer readable medium storing instructions for underwriting a business loan. The instructions, when executed by a computer processor, include functionality for obtaining a plurality of business records of a plurality of existing business entities, wherein a business record of the plurality of business records comprises a business entity profile, a plurality of recorded incomes, and a plurality of recorded expenses, generating, based on the plurality of business records, a model that correlates the business entity profile, the plurality of recorded incomes, and the plurality of recorded expenses, obtaining a business plan of a proposed business entity, wherein the business plan comprises a proposed business entity profile, a plurality of projected incomes, and a plurality of projected expenses, and generating, by using at least the proposed business entity profile as an input to the model, a statistical measure of deviation of the plurality of projected incomes and the plurality of projected expenses with respect to the plurality of existing business entities.

Other aspects of the invention will be apparent from the following transaction description and the appended claims.

DETAILED DESCRIPTION

Specific embodiments of the invention will now be described in detail with reference to the accompanying figures. Like elements in the various figures are denoted by like reference numerals for consistency. Further, in the figures, a series (two, three, or more) collinear dots mean that more elements of the same type as before the series of collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium for underwriting a business loan. In one or more embodiments of the invention, business data records of existing business entities are obtained. In particular, a business data record includes a business entity profile, a set of recorded incomes, and a set of recorded expenses. Based on the obtained business data records, a model is generated that correlates the business entity profile to the set of recorded incomes and the set of recorded expenses. Subsequently, a business plan of a proposed business entity is obtained that includes a proposed business entity profile, a set of projected incomes, and a set of projected expenses. By using the proposed business entity profile as an input to the model, a statistical measure of deviation of the set of projected incomes and the set of projected expenses is generated with respect to the existing business entities.

Figure 1:
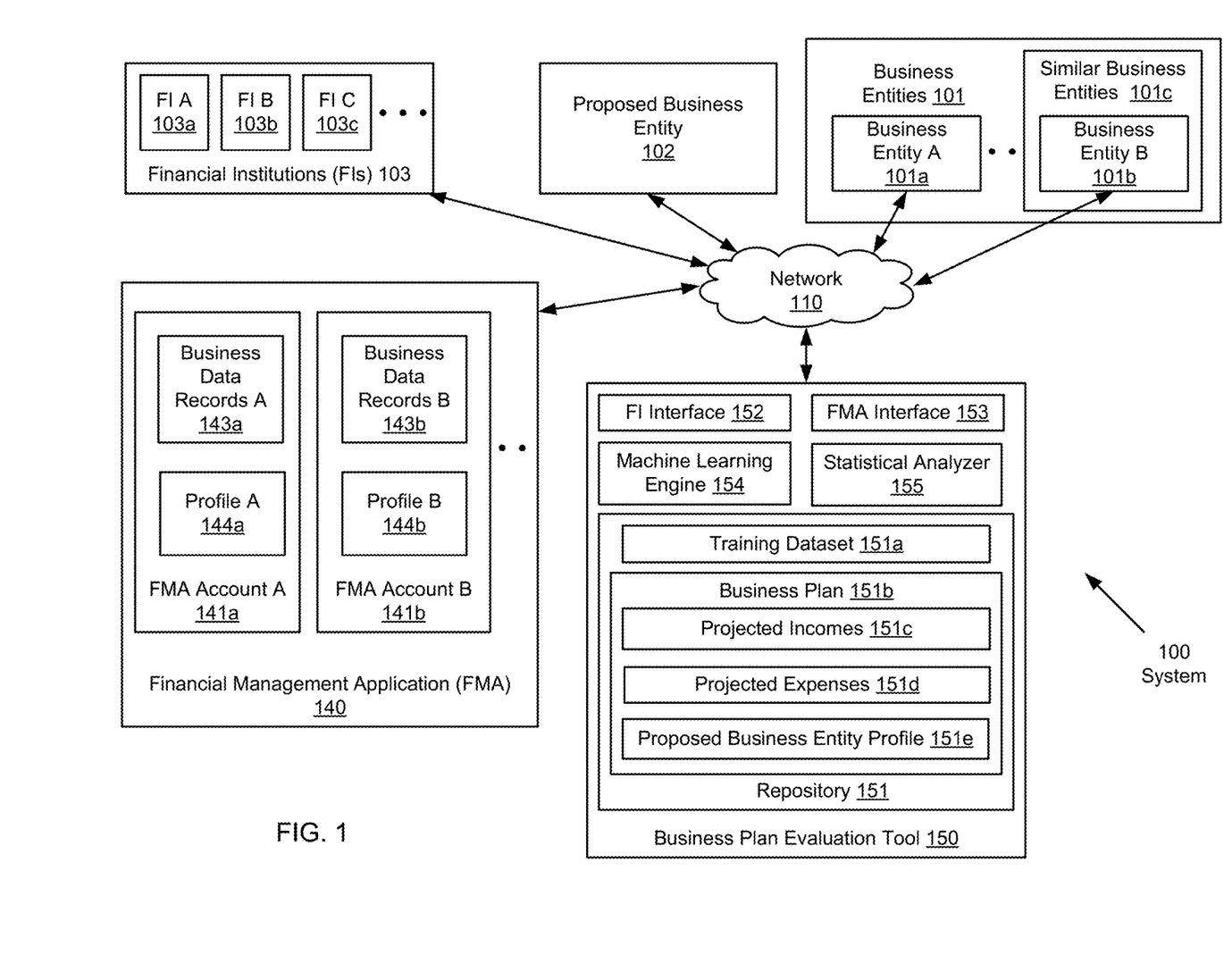
FIG. 1 shows a block diagram of a system in accordance with one or more embodiments of the invention.

FIG. 1 shows a block diagram of a system (100) in accordance with one or more embodiments of the invention. Specifically, the system (100) includes business entities (101) (e.g., business entity A (101a), business entity B (101b), etc.), a proposed business entity (102), financial institutions (FIs) (103) (e.g., FI A (103a), FI B (103b), FI C (103c), etc.) used by the business entities (101), an online financial management application (FMA) (140) used by the business entities (101), and a business plan evaluation tool (150) all of which are coupled via a network (110). In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet. Further, the business plan evaluation tool (150) includes a FI interface (152), a FMA interface (153), an machine learning engine (154), a statistical analyzer (155), and a repository (151) that are coupled to each other. In particular, the repository (151) is configured to store data used and/or generated by the FI interface (152), the FMA interface (153), the machine learning engine (154), and the statistical analyzer (155). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, each of the business entities (101) (e.g., business entity A (101a), business entity B (101b)) is a business entity that has been engaged in ongoing trading of goods, services, or both to consumers, such as an individual consumer or business consumer. In particular, an individual consumer is a person or group (e.g., family or other organization) that consumes goods and/or services. A business consumer is a business that consumes goods and/or services. In this context, the business entities (101) are also referred to as existing business entities engaged in ongoing operations. In contrast, the proposed business entity (102) may be a new business planning to enter a target market, or may be an existing business planning on a major change or a new venture associated with a new market. For example, such a new business or existing business as the proposed business entity (102) may be planning to engage, in the future, in trading of goods, services, or both to consumers in the target market or the new market. In one or more embodiments, multiple business entities within the business entities (101) may be qualified as being similar to the proposed business entity (102) and are collectively referred to as the similar business entities (101c).

In one or more embodiments of the invention, a business entity (e.g., business entity A (101a), business entity B (101b), proposed business entity (102), etc.) may be a sole proprietorship, partnership, company, non-profit organization, etc. For example, the business entity may have, or plans to have, a storefront located in at least one physical location. Alternatively or additionally, the business entity may correspond to an Internet business that has or plan to have an associated website (referred to herein as an online store). In one or more embodiments, the goods and/or services sold, or planned to be sold, by the business entity correspond to the merchandise sold by the business entity to the consumers (or possibly to one or more business entities).

Further, as used herein, the business entity is deemed to perform an action when the action is performed on behalf of the business entity. For example, an owner, agent, or officer may act on behalf of the business entity to perform an action. In one or more embodiments, each of the business entities (101) (e.g., business entity A (101a), business entity B (101b)) may include any computing device configured with computing, data storage, and network communication functionalities. For example, the business entity A (101a) may use the computing device (not shown) to access the FMA (140) to manage business financial information, such as information related to selling goods and/or services to the consumers.

Continuing with FIG. 1, in one or more embodiments of the invention, each of the business entities (101) (e.g., business entity A (101a), business entity B (101b)) includes functionality to perform one or more financial transactions with one or more customers. A financial transaction is the exchange of a merchandise item for payment. A financial transaction may be a sale of a merchandise item, a return of a merchandise item, a down payment on a merchandise item, or any other exchange of merchandise that involve finances. In one or more embodiments, the financial transaction is performed over the Internet and is referred to as an eCommerce transaction. Generally, a financial transaction is represented by a transaction record. In one or more embodiments, the transaction record is recorded information regarding the financial transaction. Each transaction record includes a transaction description of the financial transaction. The transaction description describes the financial transaction and may be a concatenation of various components. For example, the transaction description includes information about the business entity, such as a full or abbreviated name of the business entity, a location of the business entity, a store identifier of the business entity, all or part of a web address for the business entity, etc.

The transaction description further includes information about the purchased merchandise, such as a name, description, or other identifier of the merchandise, purchase price, purchase date, payment, discount, tax, etc. In some embodiments, the transaction description is provided by the business entity and may be the same or similar to transaction descriptions of other business entities. For example, the information about the purchased merchandise may include a part number or other identifier of the merchandise that is assigned by a manufacturer or supplier of the merchandise. Because multiple business entities may acquire a particular merchandise from the same manufacturer/supplier for sale to the customers, the same part number or other identifier of the particular merchandise may be repeated in multiple transaction descriptions of multiple business entities among the business entities (101). In one or more embodiments, the transaction record of an eCommerce transaction is referred to as an eCommerce document. The information contained in one or more eCommerce documents is referred to as eCommerce data.

In one or more embodiments of the invention, each of the business entities (101) (e.g., business entity A (101a), business entity B (101b)) includes functionality to perform additional financial activities separate from the financial transactions associated with purchase and/or sale of merchandise. For example, the additional financial activities may include payroll payments to employees, contractors, or other human resources of the business entity, tax and/or licensing payments to regulatory agencies/organizations, capital spending with respect to equipment/machineries, short term and/or long term loan payments, etc. The records describing the additional financial activities and the financial transaction records associated with purchase and/or sale of merchandise are collectively referred to as business data records of the business entity. In one or more embodiments, the business data records further include information derived from the records describing the additional financial activities and the financial transaction records associated with purchase and/or sale of merchandise. For example, the derived information may include a number of employees, a revenue amount, a merchandise list, a merchandise price list, a customer list, customer transaction statistics, etc.

In one or more embodiments of the invention, the FIs (103) (e.g., FI A (103a), FI B (103b), FI C (103c), etc.) are institutions that provide financial services for their clients or members, such as the business entities (101). In one or more embodiments, the proposed business entity (102) applies for a business loan from the FIs (103) (e.g., FI A (103a), FI B (103b), FI C (103c), etc.). In one or more embodiments, the FIs (103) (e.g., FI A (103a), FI B (103b), FI C (103c), etc.) include depositary institutions, contractual institutions, investment institutions, etc. Depositary institutions are deposit-taking institutions that accept and manage deposits and make loans. Examples of the depository institutions include banks, building societies, credit unions, trust companies, mortgage loan companies, etc. Contractual institutions include insurance companies and pension funds. Investment institutions include investment banks, underwriters, brokerage firms, etc.

In one or more embodiments of the invention, the FMA (140) is a set of software solutions designed to manage financial transactions and other financial activities of the business entities (101). In one or more embodiments of the invention, the FMA (140) may be an accounting software, a business tax preparation application, or any other types of business financial management application. In one or more embodiments, the FMA (140) is provided by an application service provider, such as a software as a service (SaaS). For example, the FMA (140) may be operated by the application service provider (ASP) and accessed by the business entities (101) on a subscription basis. In one or more embodiments, the business entities (101) interact with the FMA (140) to conduct or otherwise manage the aforementioned financial transactions and additional financial activities.

In one or more embodiments, the FMA (140) retrieves certain business data records from the FIs (103) used by the business entities (101). Further, the FMA (140) stores and organizes the financial activity data and retrieved business data records under individual financial accounts of the business entities (101). For example, information (i.e., transaction records and other financial activity data) associated with the business entity A (101a) is stored as the business data records A (143a) in an individual financial account (i.e., FMA account A (141a)) of the business entity A (101a).

Similarly, information (i.e., transaction records and other financial activity data) associated with the business entity B (101b) is stored as the business data records B (143b) in an individual financial account (i.e., FMA account B (141b)) of the business entity B (101b). In one or more embodiments, the business data records A (143a) includes records of payment collected and expense incurred by the business entity A (101a), and the business data records B (143b) includes records of payment collected and expense incurred by the business entity B (101b). In one or more embodiments, the business data records A (143a) are downloaded from the FI A (103a) used by the business entity A (101a) awhile the business data records B (143b) is downloaded from the FI B (103b) used by the business entity A (101b). In one or more embodiments, the FI A (103a), FI B (103b), and FIG C (103c) are competing with each other in providing financial services (e.g., business loan or business line of credit) to the business entities (101) and proposed business entity (102). Accordingly, the business data records A (143a) and business data records B (143b) are proprietary information of the FI A (103a) and FI B (103b), respectively. In other words, the business data records A (143a) and business data records B (143b) are generally not accessible to the FI C (103c). For example, the FI C (103c) does not have direct access to the business data records A (143a) and business data records B (143b) as business intelligence for providing competitive financial services (e.g., business loan or business line of credit) to the business entities (101) and proposed business entity (102).

Continuing with FIG. 1, in one or more embodiments of the invention, in addition to the business data records A (143a) of the business entity A (101a), the FMA account A (141a) further includes a profile A (144a). Similarly, in addition to the business data records B (143b) of the business entity B (101b), the FMA account B (141b) further includes a profile B (144b). In one or more embodiments, each of the profile A (144a) and the profile B (144b) includes one or more of a industry category, a business location/address, a store name, a store location, a number of stores, a number of employees, etc. of the respective business entity.

As noted above, the business plan evaluation tool (150) includes the FI interface (152), the FMA interface (153), the machine learning engine (154), the statistical analyzer (155), and the repository (151). In one or more embodiments, the repository (151) may include a disk drive storage device, a semiconductor storage device, a database management system, other suitable computer data storage device, or combinations thereof. In one or more embodiments, content stored in the repository (151) may be a data file, a linked list, a data sequence, a database, a graphical representation, or any other suitable data structure. In one or more embodiments of the invention, the repository (151) includes functionality to store data for the business plan evaluation tool (150). The data stored in the repository (151) includes a training dataset (151a) and a business plan (151b) that are generated and/or used by the FI interface (152), the FMA interface (153), the machine learning engine (154), the statistical analyzer (155). Each of these components is described below.

Continuing with FIG. 1, in one or more embodiments of the invention, the FI interface (152) is configured to obtain a business plan of the proposed business entity (102). The obtained business plan is stored in the repository (151) as the business plan (151b). In one or more embodiments, the business plan (151b) includes projected incomes (151c), projected expenses (151d), and a proposed business entity profile (151e). For example, the projected incomes (151c) may include an operating income, an interest income, an investment income, an other income, etc. that is projected by the proposed business entity (102), the projected expenses (151d) may include a rental expense, a fixed purchase expense, a variable expense, etc. that are projected by the proposed business entity (102), and the proposed business entity profile (151e) may include one or more of an industry category, a business location/address, a store name, a store location, a number of stores, a number of employees, a number of years in business, etc. that are being planned by the proposed business entity (102). In particular, the operating income, interest income, investment income, other income, etc. are referred to as income items of the business plan, the rental expense, fixed purchase expense, variable expense, etc. are referred to as expense items of the business plan, and the number of stores, the number of employees, the number of years in business, etc. are referred to as profile items of the business plan. Specifically, the business plan includes a projected value for each of the income items, each of the expense items, and each of the profile items. In one or more embodiments, when a new business plans to enter a target market, or when an existing business is to assume a major change or plan a new venture, a three to five year business plan is prepared for investors or financial institutions to evaluate investment returns in that timeframe. In other words, the projected incomes and expenses are associated with entering the target market, implementing the major change, or pursuing the new venture.

In one or more embodiments of the invention, the FMA interface (153) is configured to obtain the business data records and profile information of the business entities (101) from the FMA (140). In one or more embodiments, the business data records of a business entity includes a set of recorded incomes and a set of recorded expenses of the business entity. For example, the business data records A (143a) and profile A (144a) may be obtained from the FMA (140) where the business data records A (143a) includes recorded incomes and recorded expenses of the business entity A (101a). For example, the recorded incomes may includes the operating income already collected by the business entity of A (101a), and the recorded expenses may include the rental expense, the fixed purchase expense, and the variable expense that have already been paid by the business entity A (101a).

In one or more embodiments, the business data records and profile information of the business entities (101) are stored in the repository (151) as the training dataset (151a). In other words, the training dataset (151a) is a collection of business data records and profile information of the business entities (101). In particular, the business data records and the profile information of each business entity are associated with each other in the training dataset (151a). Specifically, each business data record and the corresponding business entity profile are stored as a business record of the business entity in the training dataset (151a). In one or more embodiments, the business entity profile is set up in the FMA (140) by the business entity user and obtained by the business plan evaluation tool (150) to build the training dataset (151a). In one or more embodiments, the collection of business data records is downloaded from multiple FIs (e.g., FI A (103a), FI B (103b), FI C (103c), etc.) used by the business entities (101) into the FMA (140) and in turn obtained by the business plan evaluation tool (150) to build the training dataset (151a). In one or more embodiments, the collection of business data records in the training dataset (151a) is downloaded into the training dataset (151a) by the business plan evaluation tool (150) directly from multiple FIs (e.g., FI A (103a), FI B (103b), FI C (103c), etc.) used by the business entities (101).

In one or more embodiments of the invention, the machine learning engine (154) is configured to generate, based on the training dataset (151a), a model that correlates the business entity profile, the recorded incomes, and the recorded expenses. In one or more embodiments, the model is a computer model (e.g., machine learning model) of statistical relationships between the business entity profile, the recorded incomes, and the recorded expenses. In one or more embodiment, the machine learning model includes a similar business entity selection algorithm, which is a statistical classifier to identify similar business entities based on the training dataset (151a). In one or more embodiments, the machine learning model is generated based on the training dataset (234) using machine learning techniques.

In one or more embodiments of the invention, the statistical analyzer (155) is configured to generate, by using at least the proposed business entity profile (151e) as an input to the model (e.g., the aforementioned machine learning model), a statistical measure of deviation of the projected incomes (151c) and the projected expenses (151d) with respect to the business entities (101). Specifically, the statistical measure of deviation represents a statistical income difference between the projected incomes (151c) and the recorded incomes of the similar business entities (101c) as well as a statistical expense difference between the projected expenses (151d) and the recorded expenses of the similar business entities (101c). In one or more embodiments, the statistical analyzer (155) generates the statistical measure of deviation of the projected incomes (151c) and the projected expenses (151d) as business plan evaluation results. In particular, the statistical analyzer (155) generates the business plan evaluation results in response to a business loan application submitted by the proposed business entity (102). For example, the FI C (103c) may receive the business loan application from the proposed business entity (102) and uses the business plan evaluation tool (150) to facilitate the loan approval/rejection decision. Because the model of the business plan evaluation tool (150) is based on the training dataset (151a) having proprietary information from multiple FIs (e.g., FI A (103a), FI B (103b), FI C (103c), etc.), the business plan evaluation tool (150) allows the FI C (103c) to make the loan approval/rejection decision based on a larger set of training data than the proprietary information of the FI C (103c) alone. In contrast, if the FI A (103a) also receives the business loan application from the proposed business entity (102) but does not use or have access to the business plan evaluation tool (150), the FI A (103a) has to make the loan approval/rejection decision based on the proprietary information of the FI A (103a) alone. As a result, the FI A (103a) will have to perform more manual business plan evaluation and will not be as cost effective nor as competitive as the FI C (103c).

In one or more embodiments, the business plan evaluation tool (150) is integrated within the FMA (140). In one or more embodiments, the business plan evaluation tool (150) is operated by a service provider that is also the service provider providing the FMA (140) to the business entities (101). In one or more embodiments, the business plan evaluation tool (150) uses the method described in reference to FIG. 2A to perform the various tasks described above. Examples of automated business plan underwriting for financial institutions are described in reference to FIGS. 3A, 3B, and 3C below.

Figure 2A:
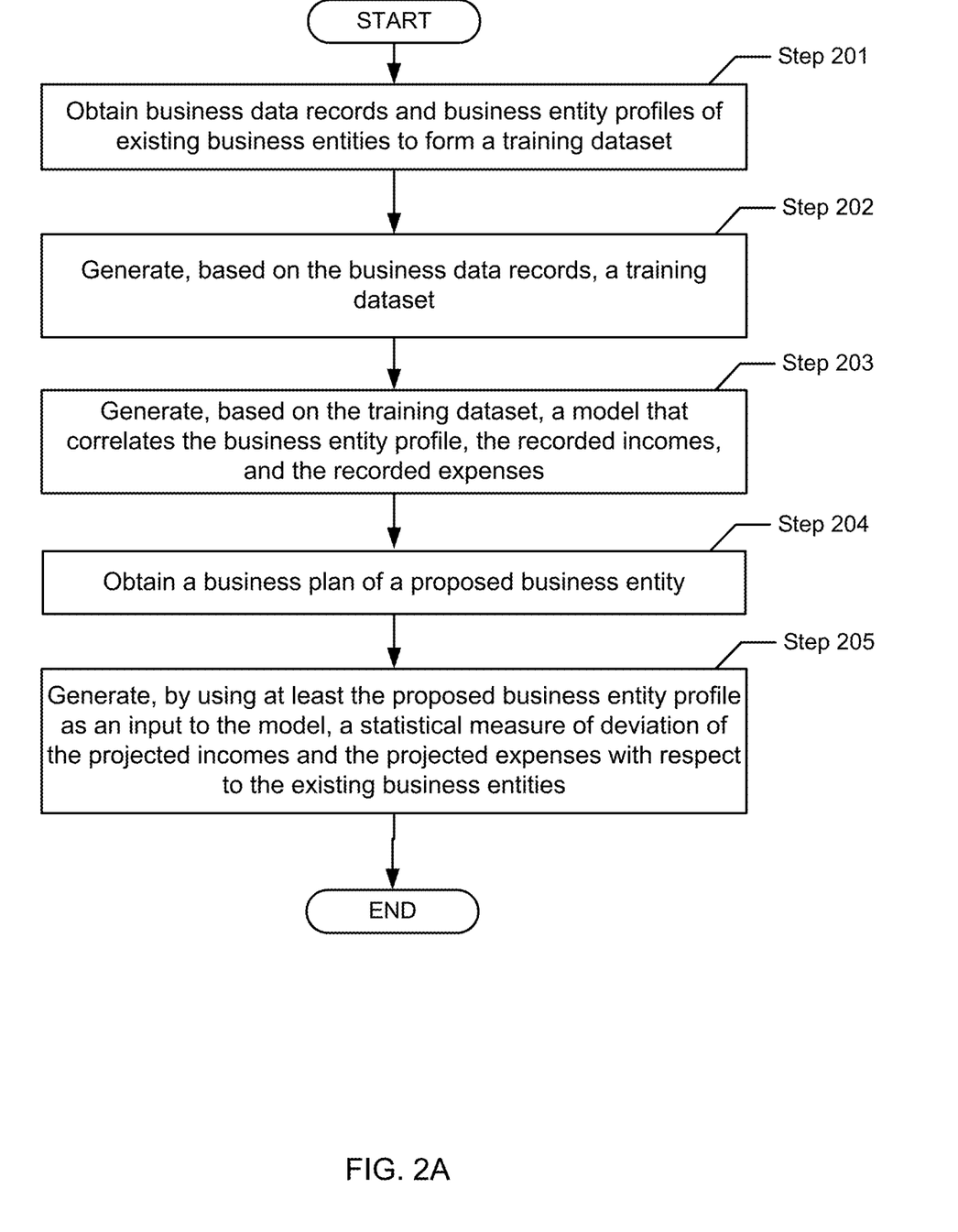
FIGS. 2A and 2B show method flowcharts in accordance with one or more embodiments of the invention.
Figure 2B:
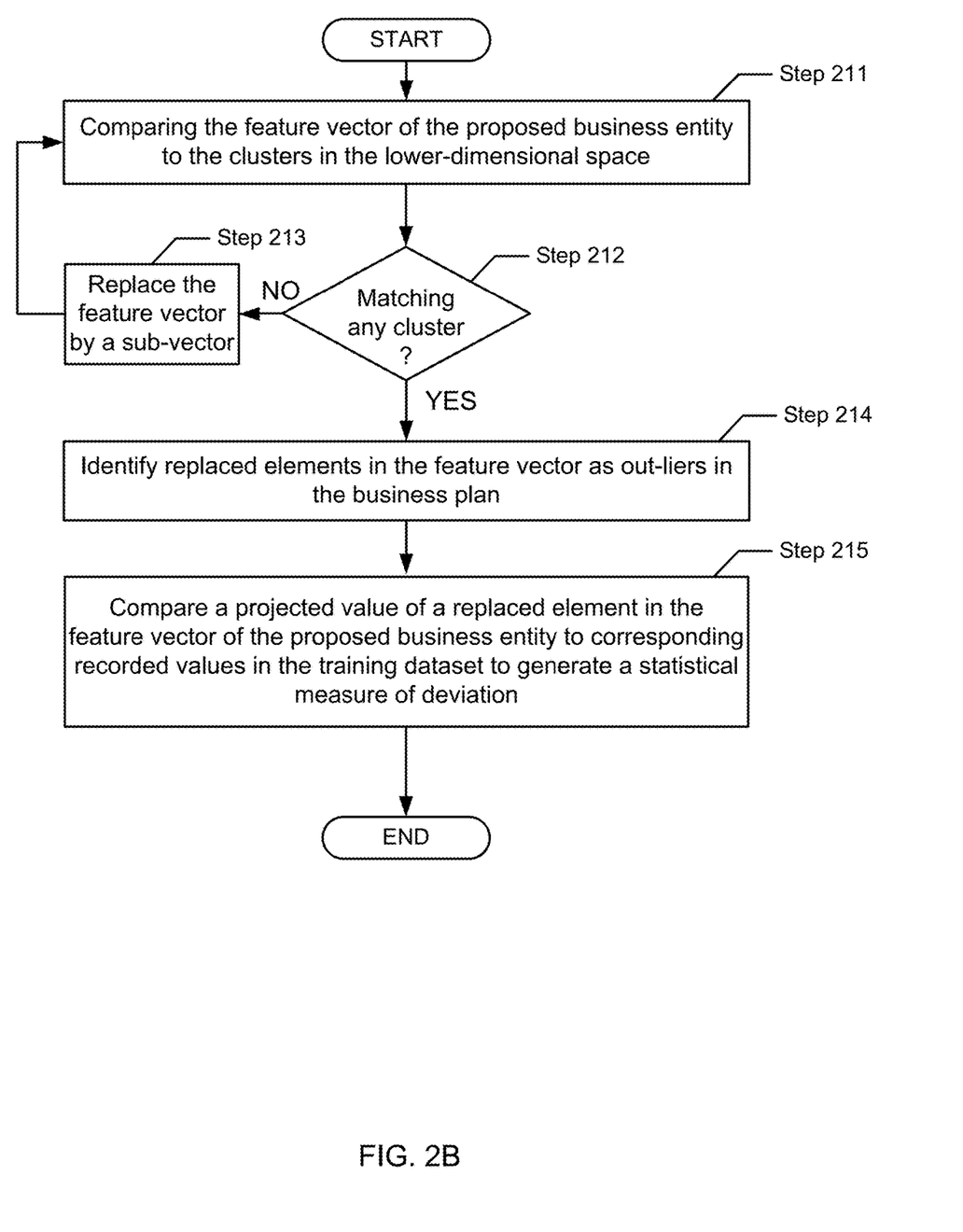

FIGS. 2A and 2B each shows a method flowchart in accordance with one or more embodiments of the invention. In one or more embodiments of the invention, the methods of FIGS. 2A and 2B may be practiced using the system (100) described in reference to FIG. 1 above. In one or more embodiments of the invention, one or more of the steps shown in FIGS. 2A and 2B may be omitted, repeated, and/or performed in a different order than that shown in FIGS. 2A and 2B. Accordingly, the specific arrangement of steps shown in FIGS. 2A and 2B should not be construed as limiting the scope of the invention.

FIG. 2A shows a flowchart for underwriting a business loan. Initially, in Step 201, a set of business records of a number of existing business entities are obtained. In one or more embodiments of the invention, a business record includes a business entity profile, a set of recorded incomes, and a set of recorded expenses. In one or more embodiments of the invention, the set of business records are obtained from a FMA or other software application used by the existing business entities.

In Step 202, the business entity profile is analyzed based on a set of profile items to generate a value of each profile item. In one or more embodiments, the value of each profile item is extracted from the business entity profile by comparing a description of the profile item and a schema template of the business entity profile. The set of recorded incomes are analyzed based on a set of income items to generate a recorded value of each income item. In one or more embodiments, the value of each income item is extracted from the recorded incomes by comparing a description of the income item and a schema template of the recorded incomes. The set of recorded expenses are analyzed based on a set of expense items to generate a recorded value of each expense item. In one or more embodiments, the value of each expense item is extracted from the recorded expenses by comparing a description of the expense item and a schema template of the recorded expenses.

In one or more embodiments, the collection of profile item values, recorded values of income items, and recorded value of expense items of each existing business entity is included as an entry in a training dataset. In particular, each entry in the training dataset is referred to as a feature vector of a corresponding existing business entity. Specifically, the vector elements of the feature vector include the profile item values, recorded values of income items, and recorded value of expense items of the corresponding existing business entity. In one or more embodiments, the income items, expense items, and profile items collectively define a feature vector space where each existing business entity corresponds to an existing business entity node in the feature vector space.

In Step 203, based on the training dataset, a model is generated that correlates the business entity profile, the recorded incomes, and the recorded expenses. In one or more embodiments, the model is generated using a machine learning algorithm to analyze the feature vectors of the existing business entities. In one or more embodiments, the model includes a set of clusters of the training dataset where each cluster corresponds to similar existing business entities. In one or more embodiments, the number of clusters are defined based on one or more income items, one or more expense items, and one or more profile items. In particular, each cluster corresponds to a subset of the number of existing business entities based on similarity of recorded values of the one or more income items, one or more expense items, and one or more profile items.

In one or more embodiments, the recorded values of the one or more income items, one or more expense items, and one or more profile items of all existing business entities in the subset are within a pre-determined range. In one or more embodiments, the one or more income items, one or more expense items, and one or more profile items collectively define a lower-dimensional space of the feature vector space. In particular, the feature vector space is reduced to the lower-dimensional space using the machine learning algorithm, such as a self learning map algorithm, a principal component analysis algorithm, etc. Similar to the feature vector space, each existing business entity also corresponds to an existing business entity node in the lower-dimensional space. Accordingly, each cluster of similar existing business entities corresponds to a region in the lower-dimensional space. In one or more embodiments, the dimensions removed from the feature vector space to form the lower-dimensional space correspond to a portion of the profile items, income items, and expense items where the recorded values show little if any clustering patterns. Accordingly, these removed dimensions are referred to as non-clustering feature elements and are not used in correlating the business entity profile, the recorded incomes, and the recorded expenses.

In Step 204, a business plan of a proposed (e.g., new, planned, growing, etc.) business entity is obtained. In one or more embodiments of the invention, the business plan is obtained from a financial institution used by or contacted by the proposed business entity. In particular, the proposed business entity submits the business plan to the financial institution to apply for a business loan or a business line of credit.

In one or more embodiments of the invention, the business plan includes a proposed business entity profile, a set of projected incomes, and a set of projected expenses. Specifically, the business plan includes a projected value for each of a number of income items, each of a number of expense items, and each of a number of profile items. In one or more embodiments, the business plan is entered into a web-based graphical user interface (GUI) by the proposed business entity based on the number of income items, the number of expense items, and the number of profile items.

In one or more embodiments, the number of income items, the number of expense items, and the number of profile items for entering the business plan are the same as the set of income items, the set of expense items, and the set of profile items for extracting the feature vectors of the existing business entities. Accordingly, the collection of projected values for each of the income items, each of the expense items, and each of the profile items forms a feature vector of the proposed business entity. In one or more embodiments, the feature vector of the proposed business entity corresponds to a proposed business entity node in the feature vector space and the lower-dimensional space.

In Step 205, using at least the proposed business entity profile as an input to the model, a statistical measure of deviation of the projected incomes and the projected expenses is generated with respect to the number of existing business entities. In one or more embodiments, a cluster in the model is identified based on at least the proposed business entity profile. In particular the proposed business entity is determined as similar to the existing business entities in the identified cluster. Accordingly, the statistical measure of deviation is generated by comparing the projected incomes and projected expenses in the business plan to the recorded values of income items and recorded values of the expense items contained in the identified cluster. In one or more embodiments, a portion of the business plan information corresponding to the aforementioned non-clustering feature elements are ignored for determining the similarity and generating the statistical measure of deviation.

In one or more embodiments, one or more statistical measures of deviation for income items and one or more statistical measures of deviation for expense items are presented to the financial institution that is evaluating the business plan of the proposed business entity. Accordingly, the financial institution makes a decision to approve the requested business loan or business line of credit if all statistical measures of deviation of the projected incomes and the projected expenses are within a pre-determined underwriting guideline. Otherwise, the financial institution makes a decision to reject the requested business loan or business line of credit if the statistical measures of deviation of the projected incomes and the projected expenses fail to meet the pre-determined underwriting guideline.

In one or more embodiments, the statistical measure of deviation is generated using the method described in reference to FIG. 2B below.

FIG. 2B shows a flowchart for generating the statistical measure of deviation of the projected incomes and the projected expenses. Initially, in Step 211, the feature vector of the proposed business entity is compared to the clusters of the model in the aforementioned lower-dimensional space. In one or more embodiments, the comparison identifies a matching cluster if the feature vector of the proposed business entity falls within the region of the matching cluster. For example, the proposed geographical location, the projected revenue, and the projected payroll expense, etc. described in the business plan are within the range with the existing locations, recorded revenues, and recorded payroll expenses found in the matching cluster. Specifically, the region of the matching cluster is defined based on the range during the model generation.

In Step 212, a determination is made as to whether the feature vector of the proposed business entity matches any cluster in the lower-dimensional space. If the determination is negative, i.e., the feature vector of the proposed business entity does not match any cluster in the lower-dimensional space, the method proceeds to Step 213. For example, a new geographic location where the proposed business entity plans to enter the target market may not match the locations of any existing business entities. In another example, the projected revenue in the business plan may be aggressive and exceed all recorded revenues of the existing business entities in the training dataset. In yet another example, the projected payroll expense in the business plan may be optimistic and less than all recorded payroll expenses of the existing business entities in the training dataset.

If the determination is positive, i.e., the feature vector of the proposed business entity matches a cluster in the lower-dimensional space, the method proceeds to Step 214.

In Step 213, the feature vector is replaced by a sub-vector before the method returns to Step 211. In one or more embodiments, a vector element is removed from the feature vector to generate the sub-vector. In one or more embodiments, a vector element is tagged as inactive in the feature vector to generate the sub-vector. In one or more embodiments, the vector element may be removed or tagged by random selection. In one or more embodiments, the vector element may be removed or tagged from the lowest or highest ranked in the order of vector elements in the feature vector. The vector element that is removed or tagged as inactive is referred to as an inactive feature element. For example, the proposed geographical location, the projected revenue, or the projected payroll expense may be removed or tagged as an inactive feature element.

In Step 214, an inactive feature element in the initial feature vector is identified as an outlier in the business plan. In particular, the removal of at least this inactive feature element from the matching determination in Step 212 renders the initial feature vector of the proposed entity to fall within the region of the matching cluster. This observation indicates that the projected value in the business plan corresponding to the inactive feature element in the feature vector is an outlier comparing to the recorded values in the training dataset. For example, the proposed geographical location, the projected revenue, or the projected payroll expense may be identified as the outlier.

In Step 215, the projected value in the business plan corresponding to the inactive feature element in the feature vector is compared to the recorded values in the training dataset to generate a statistical measure of deviation. For example, the recorded values in the training dataset corresponding to the inactive feature element in the feature vector may form a statistical distribution having a median and a standard deviation. In one or more embodiment, the statistical measure of deviation includes a difference between the statistical distribution median and the corresponding projected value in the business plan. In one or more embodiment, the difference between the statistical distribution median and the corresponding projected value in the business plan is divided by the statistical distribution standard deviation to generate a normalized statistical measure of deviation.

Figure 3A:
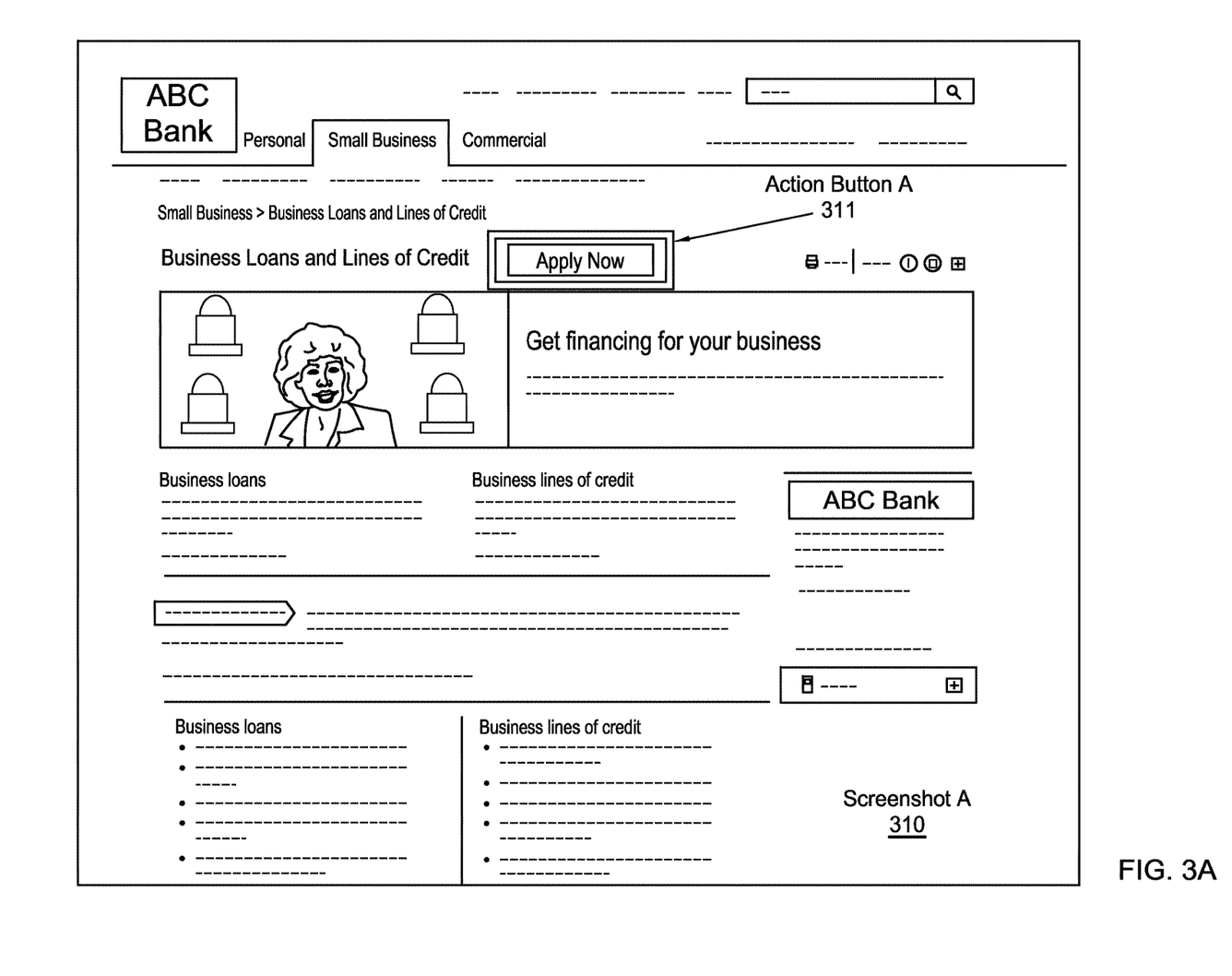
FIGS. 3A, 3B, and 3C show an example in accordance with one or more embodiments of the invention.
Figure 3B:
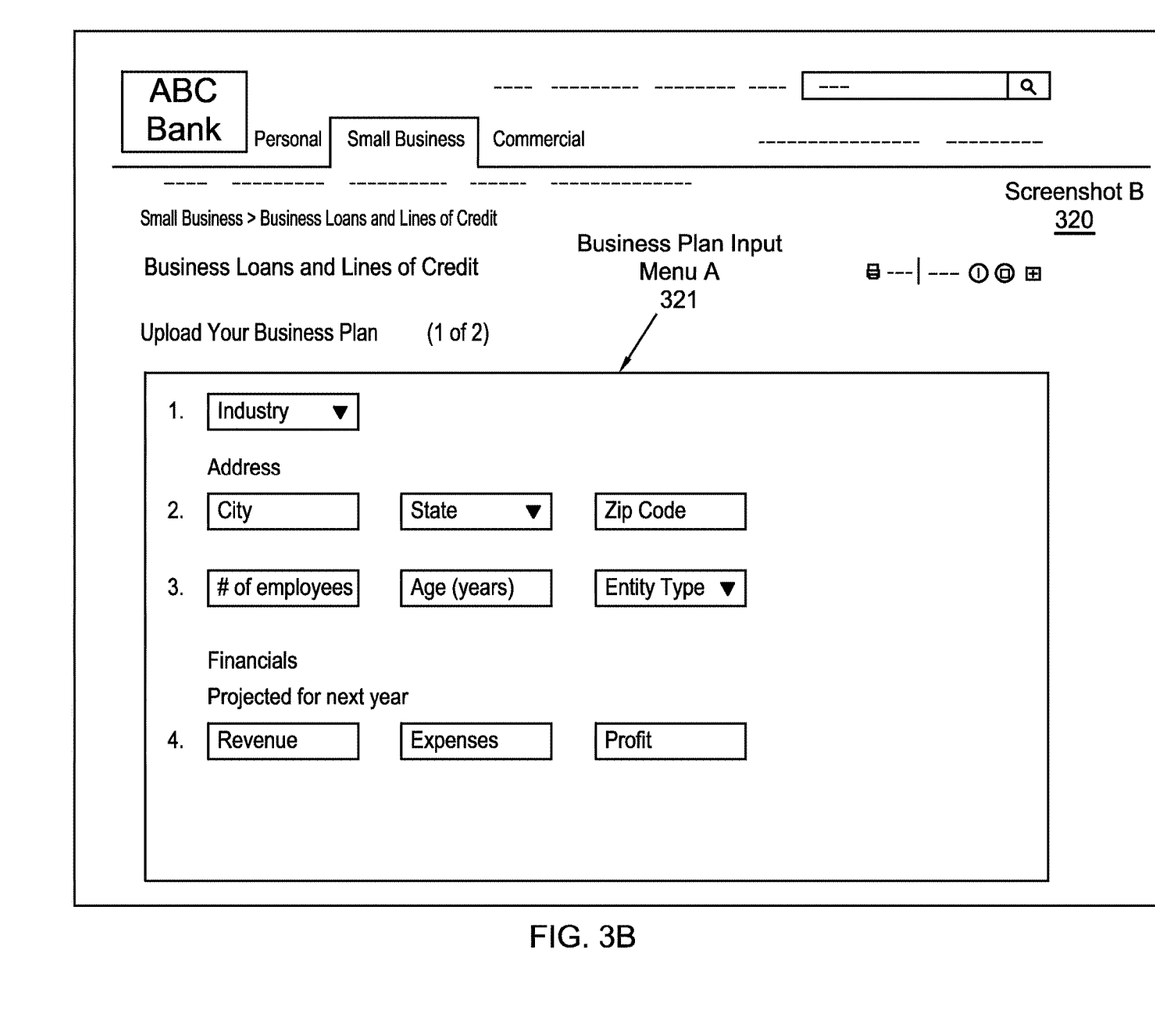
Figure 3C:
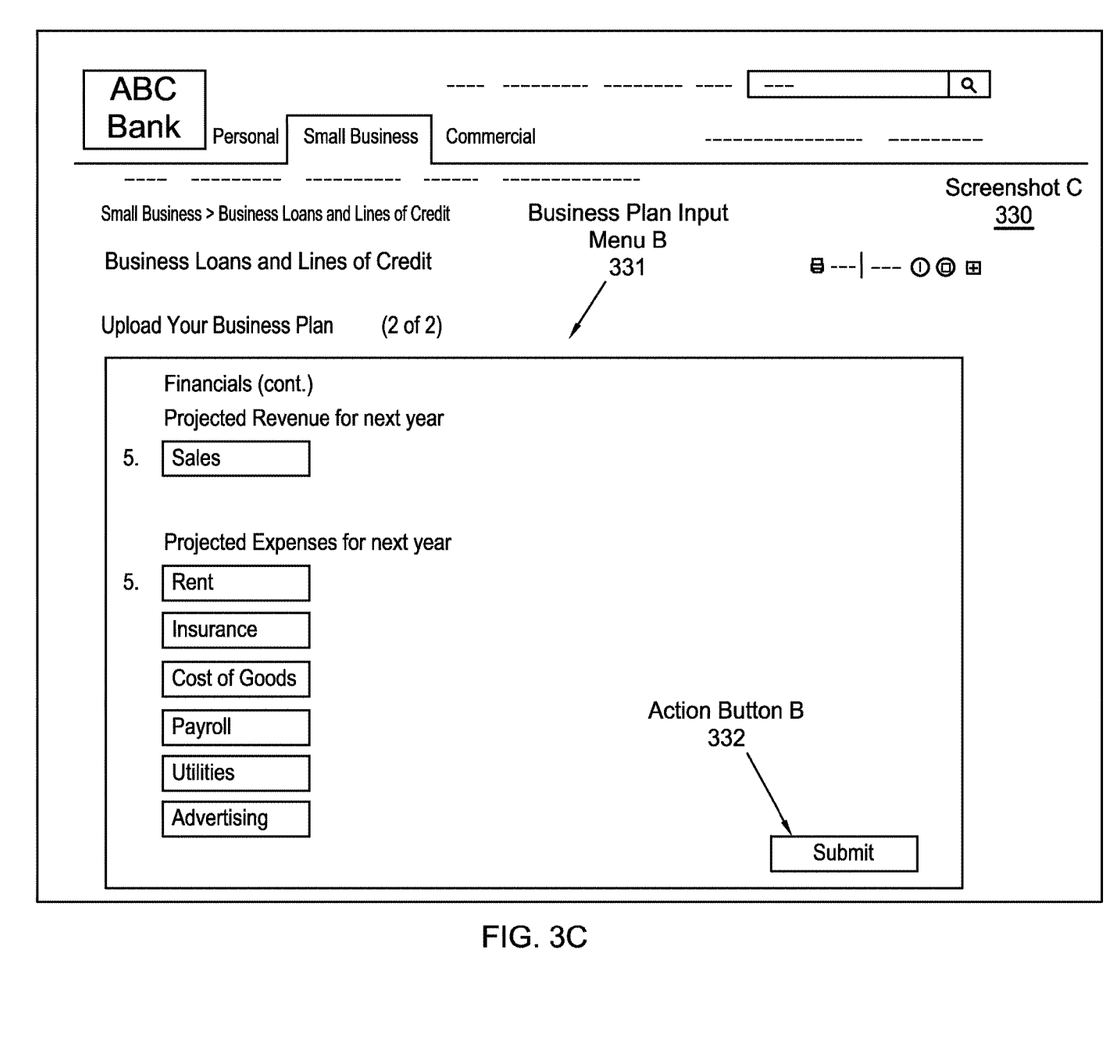

FIGS. 3A, 3B, and 3C each show an example in accordance with one or more embodiments of the invention. The example may be practiced based on the system (100) and the method flow chart depicted in FIG. 1 and FIG. 2A, respectively. Specifically, FIGS. 3A, 3B, and 3C illustrate a method to evaluate a business plan from a proposed business entity by comparing business plan projections to aggregate expense and revenue data of existing business entities that have similar profiles (e.g., industry category, etc.) to the proposed business entity. Banks may then compare loan applicants' estimated expenses (fixed costs, variable costs, labor, etc.) and revenue projections (monthly sales, transactions, seasonality trends, etc.) with actual aggregated data showing how similar businesses trend.

FIG. 3A shows an example screenshot A (310) of ABC bank's website and a corresponding GUI. In particular, a proposed business entity may use the ABC bank's website to apply for a business loan or a business line of credit. For example, the proposed business may activate the action button A (311) within the GUI to start submitting business plan information to the ABC bank for evaluating whether to approve or deny the loan application. Once the action button A (311) is activated, the website redirects to a business plan input menu shown in FIG. 3B.

FIG. 3B shows an example screenshot B (320) within the GUI of ABC bank's website. In particular, a proposed business entity may enter first level business plan information using the business plan input menu A (321) of the GUI. As shown in FIG. 3B, the first level business plan information includes business entity profile information (e.g., industry, address, employee count, year of business, type of incorporation, etc.) and projected operating results to be financed by the requested business loan or business line of credit. For example, the proposed business entity may request the business loan or business line of credit to finance entering a target market, implementing a major change, or pursuing a new venture. The projected operating results may then include the projected incomes and expenses associated with entering the target market, implementing the major change, or pursuing the new venture.

FIG. 3C shows an example screenshot C (330) of ABC bank's website. In particular, a proposed business entity may enter second level business plan information using the business plan input menu B (331). As shown in FIG. 3C, the second level business plan information includes details of projected operating results, such as projected revenue, projected rent, projected insurance, projected cost of goods, projected payroll, projected utilities, projected advertising, etc. In addition, the example screenshot C (330) includes an action button B (332) to submit the business loan application or business line of credit application to the ABC bank. Once the action button B (332) is activated, the website retrieves the business plan evaluation results from the business plan evaluation tool described above. For example, the business plan evaluation results may include a comparison of the loan applicant's projections and similar business entities' historical operating results, e.g., broken down by each input field of the business plan input menu A (321) and business plan input menu B (331). The business plan evaluation results may also highlight any fields where the projections are outliers comparing to the similar business entities' statistics. For example, a laundromat owner proposes to move to an area where local rent would be three times what a similar successful laundromat pays historically. In another example, a proposed construction business projects a revenue that is two standard deviations higher than the median of the statistical distribution of revenues reported by established construction businesses in the proposed geographical region. In both examples, the anomalies in the rental expense and the revenue are flagged as outliers to alert the underwriters at the banks who are evaluating the business plans to make lending decisions Based on the business plan evaluation results described above, the underwriters at the banks may quickly focus their attention on the areas of the business plan that appear impractical. This helps underwriters cut down on the time and research needed to complete evaluation and arrive at the approval/rejection decision in a cost effective manner.

Figure 4A:
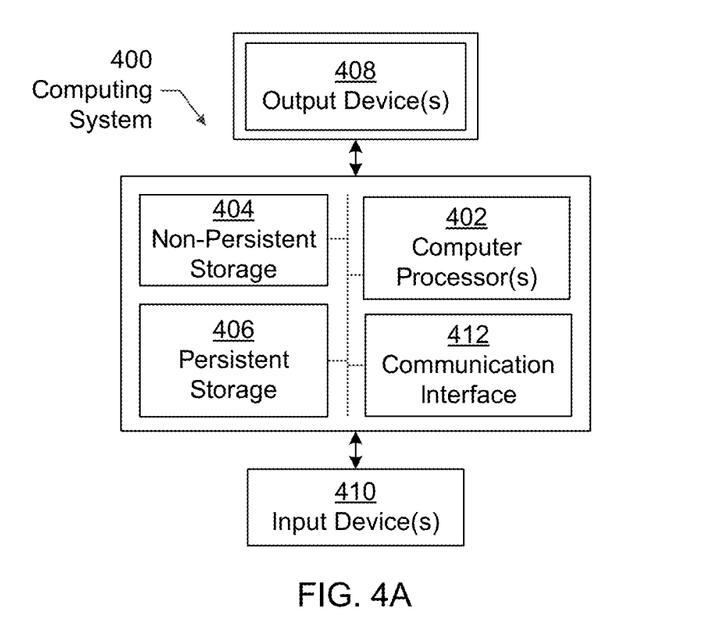
FIGS. 4A and 4B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
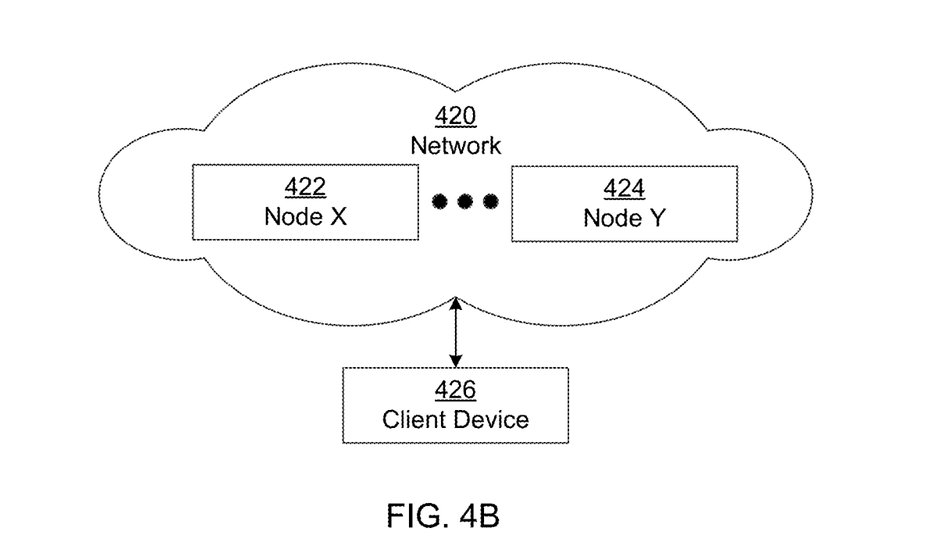

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited only by the attached claims.

What is claimed is:

1. A method, comprising:
obtaining a plurality of business records of a plurality of existing business entities, wherein a business record of the plurality of business records comprises a business entity profile, a plurality of recorded incomes, and a plurality of recorded expenses;
generating, based on the plurality of business records, a model that correlates the business entity profile, the plurality of recorded incomes, and the plurality of recorded expenses, wherein the model comprises a set of clusters of a training data set, where each cluster in the set of clusters corresponds to a subset of similar existing business entities in the plurality of existing business entities;
wherein generating the model comprises:
applying a plurality of feature vectors, corresponding to a plurality of business entity profiles of the plurality of business entities, to a machine learning algorithm; and
reducing, using the machine learning algorithm, a feature vector space to a lower-dimensional space,
wherein the feature vector space comprises data representing income items, expense items, and profile items for the plurality of existing business entities, and
wherein reducing the feature vector space comprises removing dimensions from the feature vector space that correspond to non-clustering feature elements;
obtaining a business plan of a proposed business entity, wherein the business plan comprises a proposed business entity profile, a plurality of projected incomes, and a plurality of projected expenses;
generating, by using at least the proposed business entity profile as an input to the model, a statistical measure of deviation of the plurality of projected incomes and the plurality of projected expenses with respect to the plurality of existing business entities;
generating a business plan evaluation result comprising the plurality of projected incomes, the plurality of projected expenses, and the statistical measure of deviation; and
displaying the business plan evaluation result, including highlighting fields in the business plan evaluation result where one or more of the plurality of projected incomes and the plurality of projected expenses are outliers, as determined by the statistical measure of deviation, relative to the plurality of existing business entities.

2. The method of claim 1, wherein the plurality of business records is obtained from a financial management application used by the plurality of existing business entities.

3. The method of claim 1, wherein the business plan is obtained from a financial institution used by the proposed business entity.

4. The method of claim 1, further comprising:
including the plurality of business records in the training data set.

5. The method of claim 1,
wherein the proposed business entity profile comprises an industry of the proposed business entity, and
wherein the business entity profile comprises the industry of an existing business entity of the plurality of existing business entities.

6. The method of claim 1,
wherein the plurality of projected incomes comprises an operating income of the proposed business entity, and
wherein the plurality of recorded incomes comprises the operating income of an existing business entity of the plurality of existing business entities.

7. The method of claim 1,
wherein the plurality of projected expenses comprises at least one selected from a group consisting of a rental expense, a fixed purchase expense, and a variable expense of the proposed business entity, and
wherein the plurality of recorded expenses comprises the rental expense, the fixed purchase expense, and the variable expense of an existing business entity of the plurality of existing business entities.

8. A system, comprising:
a computer processor;
memory storing instructions executable by the computer processor, wherein the instructions comprise functionality for:
obtaining a plurality of business records of a plurality of existing business entities, wherein a business record of the plurality of business records comprises a business entity profile, a plurality of recorded incomes, and a plurality of recorded expenses;
generating, based on the plurality of business records, a model that correlates the business entity profile, the plurality of recorded incomes, and the plurality of recorded expenses, wherein the model further comprises a set of clusters of a training data set, where each cluster in the set of clusters corresponds to a subset of similar existing business entities in the plurality of existing business entities;
wherein the functionality for generating the model comprises functionality for:
applying a plurality of feature vectors, corresponding to a plurality of business entity profiles of the plurality of business entities, to a machine learning algorithm; and
reducing, using the machine learning algorithm, a feature vector space to a lower-dimensional space, wherein the feature vector space comprises data representing income items, expense items, and profile items for the plurality of existing business entities, and
wherein reducing the feature vector space comprises removing dimensions from the feature vector space that correspond to non-clustering feature elements;
obtaining a business plan of a proposed business entity, wherein the business plan comprises a proposed business entity profile, a plurality of projected incomes, and a plurality of projected expenses;
generating, by using at least the proposed business entity profile as an input to the model, a statistical measure of deviation of the plurality of projected incomes and the plurality of projected expenses with respect to the plurality of existing business entities;
generating a business plan evaluation result comprising the plurality of projected incomes, the plurality of projected expenses, and the statistical measure of deviation; and
displaying the business plan evaluation result, including highlighting fields in the business plan evaluation result where one or more of the plurality of projected incomes and the plurality of projected expenses are outliers, as determined by the statistical measure of deviation, relative to the plurality of existing business entities.

9. The system of claim 8, wherein the plurality of business records is obtained from a financial management application used by the plurality of existing business entities.

10. The system of claim 8, wherein the business plan is obtained from a financial institution used by the proposed business entity.

11. The system of claim 8, wherein the instructions further comprise functionality for:
including the plurality of business records in the training data set.

12. The system of claim 8,
wherein the proposed business entity profile comprises an industry of the proposed business entity, and
wherein the business entity profile comprises the industry of an existing business entity of the plurality of existing business entities.

13. The system of claim 8,
wherein the plurality of projected incomes comprises an operating income of the proposed business entity, and
wherein the plurality of recorded incomes comprises the operating income of an existing business entity of the plurality of existing business entities.

14. The system of claim 8,
wherein the plurality of projected expenses comprises at least one selected from a group consisting of a rental expense, a fixed purchase expense, and a variable expense of the proposed business entity, and
wherein the plurality of recorded expenses comprises the rental expense, the fixed purchase expense, and the variable expense of an existing business entity of the plurality of existing business entities.

15. A non-transitory computer readable medium storing instructions which, when executed by a computer processor, comprise functionality for:
obtaining a plurality of business records of a plurality of existing business entities, wherein a business record of the plurality of business records comprises a business entity profile, a plurality of recorded incomes, and a plurality of recorded expenses;
generating, based on the plurality of business records, a model that correlates the business entity profile, the plurality of recorded incomes, and the plurality of recorded expenses, wherein the model further comprises a set of clusters of a training data set, where each cluster in the set of clusters corresponds to a subset of similar existing business entities in the plurality of existing business entities;

wherein the functionality for generating the model comprises functionality for:

applying a plurality of feature vectors, corresponding to a plurality of business entity profiles of the plurality of business entities, to a machine learning algorithm; and     reducing, using the machine learning algorithm, a feature vector space to a lower-dimensional space,     wherein the feature vector space comprises data representing income items, expense items, and profile items for the plurality of existing business entities, and     wherein reducing the feature vector space comprises removing dimensions from the feature vector space that correspond to non-clustering feature elements;

obtaining a business plan of a proposed business entity, wherein the business plan comprises a proposed business entity profile, a plurality of projected incomes, and a plurality of projected expenses;

generating, by using at least the proposed business entity profile as an input to the model, a statistical measure of deviation of the plurality of projected incomes and the plurality of projected expenses with respect to the plurality of existing business entities;

generating a business plan evaluation result comprising the plurality of projected incomes, the plurality of projected expenses, and the statistical measure of deviation; and displaying the business plan evaluation result, including highlighting fields in the business plan evaluation result where one or more of the plurality of projected incomes and the plurality of projected expenses are outliers, as determined by the statistical measure of deviation, relative to the plurality of existing business entities.

16. The non-transitory computer readable medium of claim 15, wherein the plurality of business records is obtained from a financial management application used by the plurality of existing business entities.

17. The non-transitory computer readable medium of claim 15, wherein the business plan is obtained from a financial institution used by the proposed business entity.

18. The non-transitory computer readable medium of claim 15, the instructions, when executed by the computer processor, further comprising functionality for:

including the plurality of business records in a training data set.

19. The non-transitory computer readable medium of claim 15, wherein the proposed business entity profile comprises an industry of the proposed business entity, and     wherein the business entity profile comprises the industry of an existing business entity of the plurality of existing business entities.

20. The non-transitory computer readable medium of claim 15, wherein the plurality of projected incomes comprises an operating income of the proposed business entity, and     wherein the plurality of recorded incomes comprises the operating income of an existing business entity of the plurality of existing business entities.

\* \* \* \* \*